United States Patent
Yamamoto et al.

[11] Patent Number: 5,948,290
[45] Date of Patent: Sep. 7, 1999

[54] METHOD OF FABRICATING AN INK JET RECORDING HEAD

[75] Inventors: Hajime Yamamoto; Keiichi Murai, both of Yokohama, Japan

[73] Assignee: Canon Kabushiki Kaisha, Tokyo, Japan

[21] Appl. No.: 08/925,617

[22] Filed: Sep. 9, 1997

Related U.S. Application Data

[63] Continuation of application No. 08/049,314, Apr. 21, 1993, abandoned.

[30] Foreign Application Priority Data

Apr. 21, 1992 [JP] Japan ..................................... 4-101233
Apr. 20, 1993 [JP] Japan ..................................... 5-092847

[51] Int. Cl.$^6$ .................................................. B23K 26/00
[52] U.S. Cl. ...................................................... 219/121.71
[58] Field of Search ........................... 219/121.7, 121.71; 347/47

[56] References Cited

U.S. PATENT DOCUMENTS

| | | | |
|---|---|---|---|
| 4,059,480 | 11/1977 | Ruh et al. ................................. | 347/47 |
| 4,313,124 | 1/1982 | Hara . | |
| 4,345,263 | 8/1982 | Shirato et al. . | |
| 4,459,600 | 7/1984 | Sato et al. . | |
| 4,463,359 | 7/1984 | Ayata et al. . | |
| 4,558,333 | 12/1985 | Sugitani et al. . | |
| 4,608,577 | 8/1986 | Hori . | |
| 4,723,129 | 2/1988 | Endo et al. . | |
| 4,740,796 | 4/1988 | Endo et al. . | |
| 5,132,711 | 7/1992 | Shinada et al. . | |

FOREIGN PATENT DOCUMENTS

| | | | |
|---|---|---|---|
| 164564 | 12/1985 | European Pat. Off. .......... | 219/121.71 |
| 54-056847 | 5/1979 | Japan . | |
| 59-123670 | 7/1984 | Japan . | |
| 59-138461 | 8/1984 | Japan . | |
| 60-071260 | 4/1985 | Japan . | |
| 3-169559 | 7/1991 | Japan . | |

OTHER PUBLICATIONS

Lane, R., "Fabricating an Ink Jet Nozzle," IBM Tech. Disclosure Bull, vol. 16, No. 10, p. 3413, Mar. 1974.
Fugardi, F.F. et al., "Laser Drilled Holes in Fired Ceramics," IBM Tech. Discl. Bull. vol. 14, No. 10, p. 2869, Mar. '72.
Denshi–Zairyou, p. 120, No.10, 1991.

*Primary Examiner*—P. W. Echols
*Attorney, Agent, or Firm*—Fitzpatrick, Cella, Harper & Scinto

[57] ABSTRACT

A metallic orifice plate having no aperture and a substrate is molded in a single unit with a polymer material. An aperture is formed by photolithography on a designated position of the molded orifice plate with reference to an alignment mark present on the substrate. Using the metallic orifice plate on which the aperture is formed as a mask and exposing a laser light on a polymer material reachable through the aperture, an orifice to be used for ejecting ink and to be connected to an ink fluid route formed inside the polymer material is formed. An ink supply port penetrating through the substrate is connected to the ink fluid route. In molding the orifice plate and the substrate in a single unit, a transfer forming method is used. In exposing a laser light, an excimer laser oscillator is used. The ink jet recording head fabricated by the above described method is mounted in an ink tank to be installed into a printer.

10 Claims, 6 Drawing Sheets

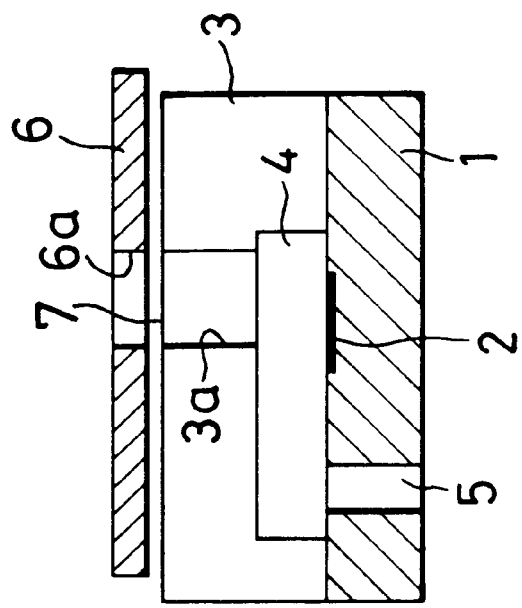
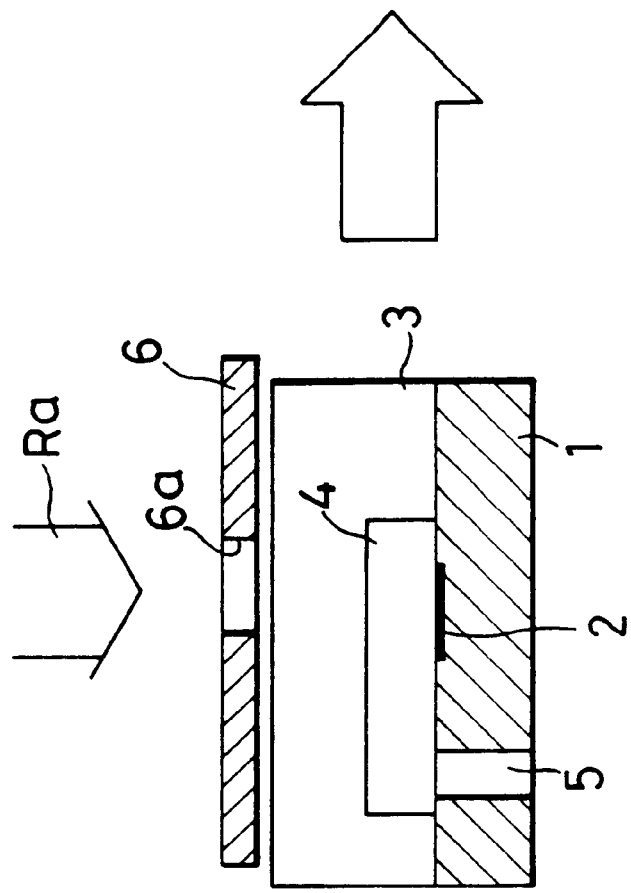
FIG. 1A (PRIOR ART)
FIG. 1B (PRIOR ART)

METHOD OF FABRICATING AN INK JET RECORDING HEAD

This application is a continuation of application Ser. No. 08/049,314 filed Apr. 21, 1993, now abandoned.

BACKGROUND OF THE INVENTION

1. Field of the Inventnion

The present invention relates to an ink jet recording head forming an image on a recording medium by ejecting an ink and its fabricating method, and to an ink jet recording cartridge having the ink jet recording head and a printer.

2. Description of the Prior Art

As an example of a method for forming an orifice in an ink jet recording head, in particular, a method for forming an orifice of the side-shoot type recording head in which ink is ejected in a direction perpendicular, to the surface of the substrate on which an ink ejection means is installed, it is known to use a metallic plate on which an aperture is formed in a designated position by etching processing, or to make a plate by electroforming. In this method, a substrate having an array of devices used as an ink ejection means and a plate (in this case, a metallic plate) having an array of orifices are formed separately by independent processes, and they are bonded to each other after that processing. Thus in the prior art, in positioning precisely the plates to be bonded to each other, it is possible to have positioning errors, and excess bonding material between plates may enter the orifice of the recording head, which degrades the performance of ejecting ink from the orifice and ultimately leads to a reduction of the quality of recorded images and characters.

In order to solve the above problems, as disclosed in Japanese Patent Application Laying-open No. 169559/1991, what is proposed is an improved method (the so-called "contact mask method") in which, after bonding a plate composed of resin on a substrate (without an aperture), an aperture is formed in the resin layer by applying a laser light through a metallic plate having an aperture which serves as a contact mask.

A prior art technique related to excimer laser processing is described, for example, in Denshi-Zairyou (in Japanese), p. 120, No. 10, 1991. The excimer laser processing has a subsidiary problem in that a conformal mask must be formed separately with respect to the processed materials.

In the processing method proposed in Japanese Patent Application Laying-open No. 169559/1991, any excess bonding material is not found in the processing because no aperture is formed at the time when the substrate and the resin layer are bonded with the bonding material. However, since the metallic plate to be used as a contact mask has an aperture of a designated diameter located at a designated position, the problems relating to an inability to position precisely the metallic plate and the substrate are not overcome. FIG. 1 shows these problems in the prior art.

FIGS. 1A and 1B are cross-sectional views each showing a neighboring area of the orifice for describing a method for forming the orifice in the prior art ink jet recording head. FIG. 1A refers to the state before forming an aperture to be used as an orifice by laser ablation processing, and FIG. 1B refers to the state after completing the aperture.

In FIGS. 1A and 1B, a component 1 is a silicon substrate. A heat generation device 2 used as an ink ejection means and its wiring are located on one face of the silicon substrate 1. An ink fluid route forming member 3 of epoxy resin having a rectangle shape is placed on this face of silicon substrate 1. Below the ink fluid route forming member 3, an ink fluid route 4 is formed as a space extending above the heat generation device 2 on the silicon substrate 1. In addition, in the silicon substrate 1, what is also formed is an ink supply port 5 connected to the ink fluid route 4 and penetrating from one face to the other face of the silicon substrate 1. The ink supply port 5 is generally formed by well known precise processing methods including ultrasonic sand polishing processing, sand-brass processing, and YAG laser processing.

As shown in FIG. 1A, in order to form an aperture to be used as an orifice, a metallic mask 6 having an aperture 6a having a designated diameter is placed near the ink fluid route forming member 3. At this time, in order to establish an ink jet recording head with good ink-ejection performance, it is necessary to control precisely the required position of the aperture 6a of the metallic mask 6 corresponding to the heat generation device 2 on the silicon substrate 1.

However, in practical processing, it is difficult to establish high precision in controlling the position of the aperture 6a of the metallic mask 6 with respect to the heat generation device 2 on the silicon substrate 1. As shown in FIG. 1A, the aperture 3a is formed by removing a resin layer partially corresponding to an open part of the ink fluid route forming member 3 below the aperture 6a laser light Ra exposed through the aperture 6a of the metallic mask 6. So far, even in forming the aperture 3a, namely the orifice 7, as shown in FIG. 1B, the result in shaping the orifice 7 may not be satisfied with the goal for positioning precisely the orifice 7 and the heat generation device 2 in an identical position.

The method of forming the orifice with the excimer laser light is a method requiring additive mechanisms and subsystems such as an optical system for correcting the energy density distribution, a mask for defining an array of apertures in a designated pattern, and a mechanism for adjusting the positions of the substrate and the projected excimer laser light shining through the mask. With this method, it is difficult to process a large-sized substrate and the operating cost is high in view of the durability of optical components to laser light exposure. Thus, though this kind of method in the prior art uses laser light for processing, the problems described above are found to be common to the mechanical processing of materials which cannot be solved ever in this method.

As for the water resistivity of the surface of the orifice plate which is required to insure durability even in view of contact with the ink fluids, the fabricating method in the prior art has the following problems. In the case where water-resistive resin, in most cases, a fluorine-containing polymer, is coated before an aperture is formed by the laser light exposure, insufficient ablation occurs and hence, excess water-resistive resin remains around the orifice because the water-resistive resin does not absorb the ultraviolet component of the excimer laser light. This leads to an inabiility to eject ink in a designated direction.

In the case that the metallic plating layer 8 having water-resistive property is formed on the surface of the ink fluid route forming member 3 before forming an aperture by the excimer laser light exposure, as shown in FIGS. 2A and 2B, instead of coating water-resistive resin, the intensity of the energy density of the excimer laser is required to be three to ten times as large as in the case of coating water-resistive resin, and in addition, the process for forming an aperture with the laser light having such a strong intensity is accompanied by heat generation, and hence, due to thermal expansion of the orifice plate and the substrate, the required accuracy for shaping the orifice aperture cannot be attained. So, as shown in FIG. 2C, the cross-section of the orifice 7 cannot be shaped in a true circle but is shaped like an oval or even may be shaped in an eccentric circle having concave and convex parts on a peripheral edge of the orifice 7 and on an inner surface thereof.

In addition, what is well known is that, in forming an aperture by the laser light exposure, the horizontal cross-section of the aperture to be formed as an orifice decreases along the laser light path, which means that the shape of the orifice is a tapered hollow cylinder. In this structure of the orifice, the closer the ink comes to the edge of the orifice, the more the velocity of ejected ink is reduced.

SUMMARY OF THE INVENTION

A fabricating apparatus for producing an ink jet recording head according to the present invention implements an invention involving a fabricating method and this invention also includes the ink jet recording head or ink jet recording cartridge made by using the above described fabrication method.

The head and the cartridge thus obtained serve as major components of a printer prepared according to the present invention.

In the first aspect of the present invention, there is provided a method for fabricating an ink jet recording head, comprising the steps of:

(a) forming a photo-resist portion on one face of a substrate, the substrate having a device arranged on the one face of the substrate for generating energy to utilize for ejecting an ink and an ink supply port formed so as to extend from one face to the other face of the substrate, the photo-resist portion covering the energy generating device and the ink supply port;

(b) arranging a metallic plate so as to separate from the substrate with a gap and to face the energy generating device of the substrate to the metallic plate;

(c) forming a layer of a resin in the gap to integrate the metallic plate with the substrate by the resin layer;

(d) forming an aperture in the metallic plate to expose a part of the resin layer through the aperture;

(e) irradiating an excimer laser light toward the resin layer exposed through the aperture to form an ink ejection port which penetrates the resin layer and reaches to the photo-resist portion; and (f) removing the photo-resist portion to form an ink fluid route connecting the ink supply port with the ink ejection port.

In the second aspect of the present invention, there is provided a method for fabricating an ink jet recording head, comprising the steps of:

(a) forming a photo-resist portion on one face of a substrate, the substrate having a device arranged on the one face of the substrate for generating energy to utilize for ejecting an ink and an ink supply port formed so as to extend from one face to the other face of the substrate, the photo-resist portion for covering the energy generating device and the ink supply port;

(b) bonding a metallic plate to a top plate including a material having high molecular weight, the top plate being firmly mounted on the substrate;

(c) forming an aperture in the metallic plate to expose a part of the top plate through the aperture;

(d) irradiating an excimer laser light toward the top plate exposed through the aperture to form an ink ejection port which penetrates the top plate and reaches to the photo-resist portion; and (e) removing the photo-resist portion to form an ink fluid route connecting the ink supply port with the ink ejection port.

In the third aspect of the present invention, there is provided a method for fabricating an ink jet recording head, comprising the steps of:

(a) forming a photo-resist portion on one face of a substrate, the substrate having a device arranged on the one face of the substrate for generating energy to utilize for ejecting an ink and an ink supply port formed so as to extend from one face to the other face of the substrate, the photo-resist portion for covering the energy generating device and the ink supply port;

(b) bonding a top plate including a material having high molecular weight to the substrate, the top plate being firmly mounted on a metallic plate;

(c) forming an aperture in the metallic plate to expose a part of the top plate through the aperture;

(d) irradiating an excimer laser light toward the top plate exposed through the aperture to form an ink ejection port which penetrates the top plate and reaches to the photo-resist portion; and (e) removing the photo-resist portion to form an ink fluid route connecting the ink supply port with the ink ejection port.

In the fourth aspect of the present invention, there is provided a method for fabricating an ink jet recording head, comprising the steps of:

(a) forming a photo-resist portion on one face of a substrate, the substrate having a device arranged on the one face of the substrate for generating energy to utilize for ejecting an ink and an ink supply port formed so as to extend from one face to the other face of the substrate, the photo-resist portion for covering the energy generating device and the ink supply port;

(b) plating a layer composed mainly of a metallic material on a top plate, the top plate being firmly mounted on the substrate;

(c) forming an aperture in the plated layer to expose a part of the top plate through the aperture;

(d) irradiating an excimer laser light toward the top plate exposed through the aperture to form an ink ejection port which penetrates the top plate and reaches to the photo-resist portion; and (e) removing the photo-resist portion to form an ink fluid route connecting the ink supply port with the ink ejection port.

Here, the energy generating device may be an electro-thermal transducer which generates thermal energy to cause film boiling of an ink.

The excimer laser light may be obtained using an optical resonator installed in an excimer laser oscillator.

The excimer laser light may be obtained with an optical system amplifying a diverging light component of the excimer laser light.

The method may further comprise the step of scanning the excimer laser light on a workpiece which is obtained by integrating the substrate with the top plate, while moving relatively one of the excimer laser light and the workpiece, or moving both the excimer laser light and the workpiece.

The method may further comprise the step of plating Au or Pt on the plated layer having the aperture, prior to the excimer laser light irradiating step.

The method may further comprise the step of plating Au or Pt on the plated layer having the aperture, after the excimer laser light irradiating step.

The metallic plating layer may be an eutectic plating layer which is obtained from a metal and a par-fluorocarbon including a fluorine-containing polymer or a fluorine-containing oligomer.

The metallic plating layer may be an eutectic plating layer which is obtained from a metal and a fluorine-containing graphite.

In the fifth aspect of the present invention, there is provided an ink jet recording head, comprising:
a substrate having two faces, the substrate including;
a device arranged on the one face of the substrate for generating energy to utilize for ejecting an ink, and
an ink supply port formed so as to extend from one face to the other face of the substrate;
an ink fluid route forming member having an ink fluid route formed therein, the ink fluid route for connecting to the ink supply port of the substrate and for providing a space including the energy generating device; and
a metallic plate having an ink ejection port for connecting to the ink fluid route, the metallic plate being integrated through the ink fluid forming member with the substrate.

In the sixth aspect of the present invention, there is provided an ink jet recording head, comprising:
a substrate having two faces, the substrate including;
a device arranged on the one face of the substrate for generating energy to utilize for ejecting an ink, and
an ink supply port formed so as to extend from one face to the other face of the substrate;
a top plate including a material having high molecular weight, the top plate being firmly mounted on the substrate and having an ink fluid route for connecting to the ink supply port of the substrate and for providing a space including the energy generating device; and
a metallic plate having an ink ejection port for connecting to the ink fluid route, the metallic plate bonding to the top plate.

In the seventh aspect of the present invention, there is provided an ink jet recording head, comprising:
a substrate having two faces, the substrate including;
a device arranged on the one face of the substrate for generating energy to utilize for ejecting an ink, and
an ink supply port formed so as to extend from one face to the other face of the substrate;
a top plate including a material having high molecular weight, the top plate being firmly mounted on the substrate; and
a plated layer formed on the top plate, the plated layer composed mainly of a metal having an aperture, wherein the top plate has an ink fluid route for connecting the aperture of the plated layer with the ink supply port and for providing a space including the energy generating device.

In the eighth aspect of the present invention, there is provided an ink jet recording cartridge, comprising:
a portion for mounting an ink jet recording head, the ink jet recording head including;
a substrate having two faces, the substrate including;
a device arranged on the one face of the substrate for generating energy to utilize for ejecting an ink, and
an ink supply port formed so as to extend from one face to the other face of the substrate;
an ink fluid route forming member having an ink fluid route formed therein, the ink fluid route for connecting to the ink supply port of the substrate and for providing a space including the energy generating device; and
a metallic plate having an ink ejection port for connecting to the ink fluid route, the metallic plate being integrated through the ink fluid forming member with the substrate.

In the ninth aspect of the present invention, there is provided an ink jet recording cartridge, comprising:
a portion for mounting an ink jet recording head, the ink jet recording head including;
a substrate having two faces, the substrate having;
a device arranged on the one face of the substrate for generating energy to utilize for ejecting an ink, and
an ink supply port formed so as to run from one face to the other face of the substrate;
a top plate including a material having a high molecular weight, the top plate being firmly mounted on the substrate and having an ink fluid route for connecting to the ink supply port of the substrate and for providing a space including the energy generating device; and
a metallic plate having an ink ejection port for connecting to the ink fluid route, the metallic plate bonding to the top plate.

In the tenth aspect of the present invention, there is provided an ink jet recording cartridge, comprising:
a portion for mounting an ink jet recording head, the ink jet recording head including;
a substrate having two faces, the substrate having;
a device arranged on the one face of the substrate for generating energy to utilize for ejecting an ink, and
an ink supply port formed so as to extend from one face to the other face of the substrate;
a top plate including a material having high molecular weight, the top plate being firmly mounted on the substrate; and
a plated layer formed on the top plate, the plated layer being composed mainly of a metal having an aperture, wherein the top plate has an ink fluid route for connecting to both the aperture of the plated layer and the ink supply port and for providing a space including the energy generating device.

In the eleventh aspect of the present invention, there is provided a printer, comprising:
a portion for mounting an ink jet recording head, the ink jet recording head including;
a substrate having two faces, the substrate having;
a device arranged on the one face of the substrate for generating energy to utilize for ejecting an ink, and
an ink supply port formed so as to extend from one face to the other face of the substrate;
an ink fluid route forming member having an ink fluid route formed therein, the ink fluid route for connection to the ink supply port of the substrate and for providing a space including the energy generating device; and
a metallic plate having an ink ejection port for connecting to the ink fluid route, the metallic plate being integrated through the ink fluid forming member with the substrate.

In the twelfth aspect of the present invention, there is provided a printer, comprising:

a portion for mounting an ink jet recording head, the ink jet recording head including;
  a substrate having two faces, the substrate having;
    a device arranged on the one face of the substrate for generating energy to utilize for ejecting an ink, and
    an ink supply port formed so as to extend from one face to the other face of the substrate;
  a top plate including a material having a high molecular weight, the top plate being firmly mounted on the substrate and having an ink fluid route for connecting to the ink supply port of the substrate and for providing a space including the energy generating device; and
  a metallic plate having an ink ejection port for connecting to the ink fluid route, the metallic plate bonding to the top plate.

In the thirteenth aspect of the present invention, there is provided a printer, comprising:
a portion for mounting an ink jet recording head, the ink jet recording head including;
  a substrate having two faces, the substrate having;
    a device arranged on the one face of the substrate for generating energy to utilize for ejecting an ink, and
    an ink supply port formed so as to extend from one face to the other face of the substrate;
  a top plate including a material having a high molecular weight, the top plate being firmly mounted on the substrate; and
  a plated layer formed on the top plate, the plated layer being composed mainly of a metal having an aperture, wherein the top plate has an ink fluid route for connecting the aperture of the plated layer with the ink supply port and for providing a space including the energy generating device.

In the fourteenth aspect of the present invention, there is provided a printer, comprising:
a portion for mounting an ink jet recording cartridge,
the ink jet recording cartridge comprising:
  an ink jet recording head, including;
    a substrate having two faces, the substrate having;
      a device arranged on the one face of the substrate for generating energy to utilize for ejecting an ink, and
      an ink supply port formed so as to extend from one face to the other face of the substrate;
    an ink fluid route forming member having an ink fluid route formed therein, the ink fluid route for connecting to the ink supply port of the substrate and for providing a space including the energy generating device; and
    a metallic plate having an ink ejection port for connecting to the ink fluid route, the metallic plate being integrated through the ink fluid forming member with the substrate.

In the fifteenth aspect of the present invention, there is provided a printer, comprising:
a portion for mounting an ink jet recording cartridge, the ink jet recording cartridge comprising:
  an ink jet recording head, including;
    a substrate having two faces, the substrate having;
      a device arranged on the one face of the substrate for generating energy to utilize for ejecting an ink, and
      an ink supply port formed so as to extend from one face to the other face of the substrate;
    a top plate including a material having a high molecular weight, the top plate being firmly mounted on the substrate and having an ink fluid route for connecting to the ink supply port of the substrate and for providing a space including the energy generating device; and
    a metallic plate having an ink ejection port for connecting to the ink fluid route, the metallic plate bonding to the top plate.

In the sixteenth aspect of the present invention, there is provided a printer, comprising:
a portion for mounting an ink jet recording cartridge,
the ink jet recording cartridge comprising:
  an ink jet recording head, including;
    a substrate having two faces, the substrate having;
      a device arranged on the one face of the substrate for generating energy to utilize for ejecting an ink, and
      an ink supply port formed so as to extend from one face to the other face of the substrate;
    a top plate including a material having a high molecular weight, the top plate being firmly mounted on the substrate; and
    a plated layer formed on the top plate, the plated layer being composed mainly of a metal having an aperture, wherein the top plate has an ink fluid route for connecting to both the aperture of the plated layer and the ink supply port and for providing a space including the energy generating device.

In the present invention, as the metallic plate to be used as a large-sized orifice plate for forming an orifice and a large-scale substrate are molded in a single unit, for example, by transfer forming method, and the orifice can be formed highly precisely with reference to the alignment mark formed on the silicon substrate and so on by photolithography technology, the metallic plate as an orifice plate on which the orifice is formed and the substrate can be bonded to each other without displacement.

As the orifice plate is defined as a contact mask, the aperture to be used for the ink fluid supply route can be formed by the excimer laser light exposure without any additional and specific precise positioning mechanism so that the accuracy of shaping the aperture in the orifice plate may be propagated on that of the aperture formed in the resin layer. This means that by using such a processing method as conformal mask method and making the contact mask used to be a member of the recording head, the steps for positioning and bonding with high precision which are required in fabricating the prior art ink jet recording head can be eliminated.

In addition, as the surface of the single unit molded with the substrate and the orifice plate by the excimer laser light, it will be appreciated that the reduction of accuracy in shaping the orifice due to the non-uniform energy density distribution can be avoided. In this case, as an additiional optical system for adjusting the energy density distribution is not required, and the size of processed substrates can be increased, the fabricating cost may be reduced. In comparison with step-and-repeat method used in the stepper apparatus used for processing large-sized substrates, it is advantageous that the fabricating apparatus according to the present invention may be formed with a simpler structure in order to obtain the same results as the step-and-repeat method.

In addition, as the water resistivity processing on the surface of the orifice plate is finished before the excimer laser exposure with employment of plating and photo-litho-etching methods, a plating layer having a high water resistivity and long term stability against alkaline containing ink fluids can be formed without disturbing the accuracy in shaping the orifice.

In addition, by increasing the intensity of diverging light component of the excimer laser light in order to control the range of the excimer laser light in defining the shape of the inner face of the orifice, the shape of the inner face of the orifice can be formed with a back taper which is advantageous for increasing the performance of ejecting ink from the ink jet recording head.

The above and other objects, effects, features and advantages of the present invention will become more apparent from the following description of embodiments thereof taken in conjunction with the accompanying drawings.

BRIEF DESCRIPTION OF THE DRAWINGS

FIG. 1A is a vertical cross-sectional view showing a neighboring area of an orifice during laser ablation as one process of a prior art method for forming the orifice;

FIG. 1B is a vertical cross-sectional view showing a neighboring area of an orifice after laser ablation of FIG. 1A;

DETAILED DESCRIPTION OF PREFERRED EMBODIMENTS

Embodiment 1

Figure 3:
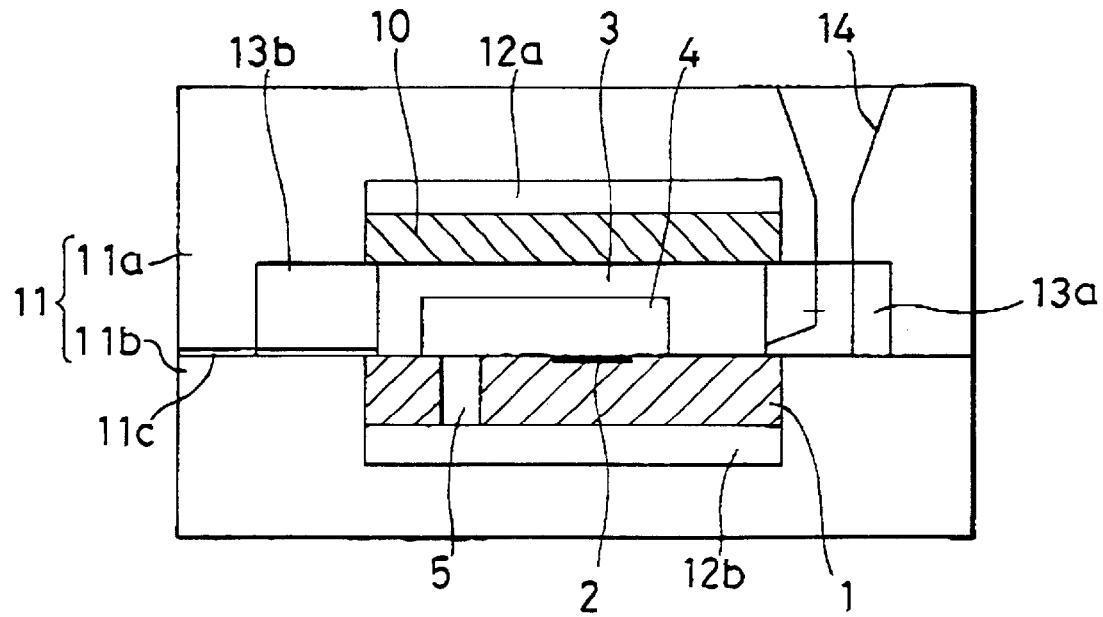
FIG. 3 is a vertical cross-sectional view showing a metal mold for performing a transfer forming method which can be applied to the present invention.
Figure 4:
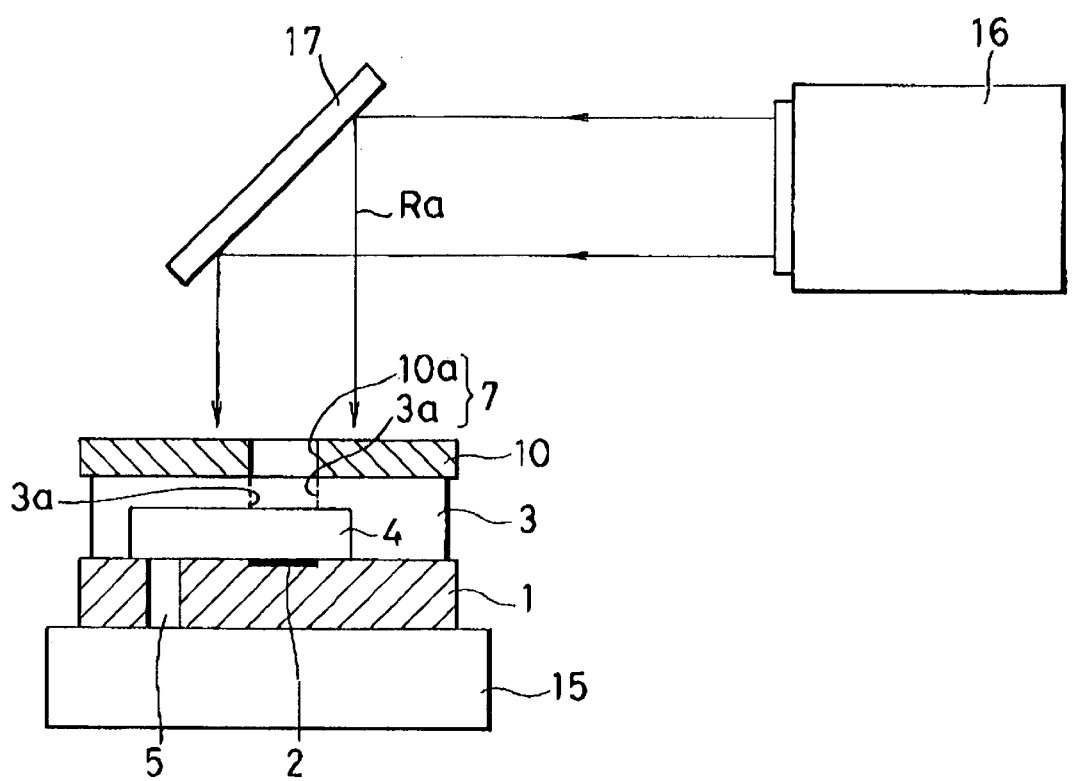
FIG. 4 is a vertical cross-sectional view showing an embodiment of method for fabricating an ink jet recording head according to the present invention.

FIGS. 3 and 4 are cross-sectional views each showing one embodiment of an ink jet recording head and its fabricating method according to the present invention.

Figures 2A, 2B, 2C:
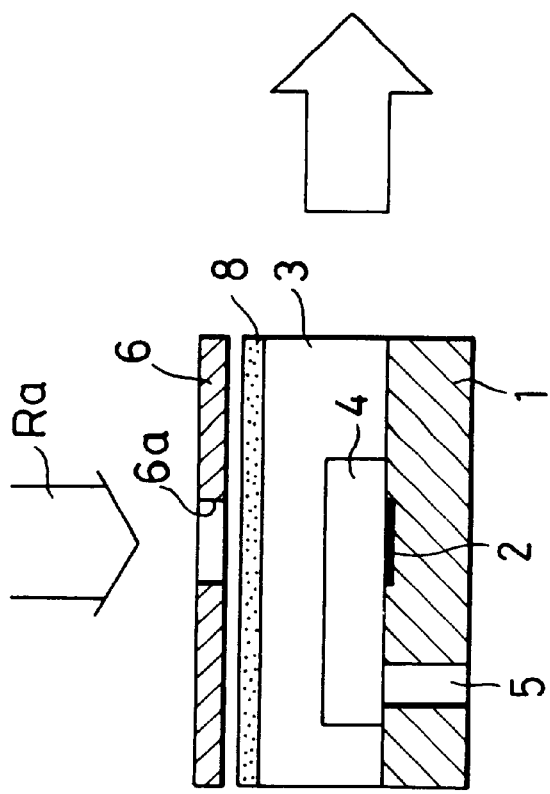
FIG. 2A is a vertical cross-sectional view showing a neighboring area of an orifice during laser ablation as one process of another prior art method of forming the orifice.
FIG. 2B is a vertical cross-sectional view showing a neighboring area of an orifice after laser ablation of FIG. 2A.
FIG. 2C is a plan view showing the orifice formed by the laser ablation of FIG. 2A.

In FIGS. 3 and 4, like parts of the components in FIGS. 1A and 1B or FIGS. 2A; 2B and 2C are assigned like numerals and their redundant explanations are not repeated.

In this embodiment, at first, a positive type photoresist (not shown) 40 $\mu$m in thickness covering one end of the heat generation device 2 and an ink supply port 5 on the silicon substrate 1 is formed on the silicon substrate 1. The silicon substrate 1 with positive type photoresist and the metallic plate 10 made of Ni 20 $\mu$m in thickness to be used as an orifice plate are made to face each other in the mold for transfer forming shown in FIG. 3. That is, as shown in FIG. 3, the metallic plate 10 is mounted inside the upper metallic mold 11a of the metallic mold 11 and the rubber buffer sheet 12a is inserted between the metallic plate 10 and the inside face of the upper metallic mold 11a. Similarly, the silicon substrate 1 is mounted inside the lower metallic mold 11b and the rubber buffer sheet 12b is inserted between the substrate 1 and the inside face of the upper metallic mold 11b. Prior to overlapping both of the upper metallic mold 11a and the lower metallic mold 11b, the gap between them is established by inserting the spacers 13a and 13b having the thickness 60 $\mu$m at the edges of the upper metallic mold 11a and the lower metallic mold 11b. Thus, a space having a designated volume is defined between the silicon substrate 1 and the metallic plate 10, and the air extraction port 11c is also formed between the metallic molds 11a and 11b. A resin port 14 is formed in the upper metallic mold 11a for supplying, for example, epoxy resin. to the inside of the mold cavity. The resin port 14 is extended up to the above described space through the inside of the spacer 13a in this embodiment, which embodiment is shown in FIGS. 3 and 4. In addition, the heater for heating the inside space of the metallic mold and the resin port to a designated temperature and the temperature control mechanism accompanying the heater are installed in the metallic mold 11, which are not shown in FIGS. 3 and 4. Next, using the transfer forming method, epoxy resin is supplied from the resin port 14, the ink fluid route forming member 3 composed of epoxy resin is formed between the silicon substrate 1 and the metallic plate 10 after hardening the supplied resin, and thus, the silicon substrate 1 and the metallic plate 10 are combined in a single unit. And next, after the molded unit composed of solidified epoxy resin is extracted from the metallic mold 11, the photoresist pattern is developed on the metallic plate 10 with reference to an alignment mark (not shown) on the silicon substrate 1, and then the aperture 10a is formed as a part of the orifice 7 at a designated position on the metallic plate 10 by patterning processing. This patterning processing on the photoresist layer is applied continuously until a part of the ink fluid route forming member 3 is found at the bottom of the aperture 10a. And next, the photoresist on the metallic plate 10 is removed while the positive type photoresist on the silicon substrate 1 still remains.

Next, as shown in FIG. 4, the silicon substrate 1 including the metallic plate 10 formed as a single unit is made to be fixed on the scanning mechanism 15 which can be moved in the horizontal direction over a two-dimensional plane. The excimer laser oscillator 16 and the position and direction of the reflection mirror 17 placed along the laser light path extended from the excimer laser oscillator 16 are so controlled that the excimer laser light Ra may be exposed toward the scanning mechanism 15. KrF excimer laser light (the light wavelength is 248 nm) having an energy density 100 mJ/cm$^2$ generated by the excimer laser oscillator 16 is exposed onto the exposed surface of the ink fluid route forming member 3 in the aperture 10a of the metallic plate 10. At the same time, the laser light exposure is scanned by moving the silicon substrate 1 with respect to the reflection mirror 17 by the scanning mechanism 15. With these operations, only the epoxy resin at the exposed part of the ink fluid route forming member 3 will be removed selectively and gradually by laser ablation, and thus the aperture 3a can be formed. The laser light exposure lasts until the positive type photoresist layer on the silicon substrate 1 is reached. So far, the orifice 7 for ejecting ink fluids can be completed so as to be composed of the aperture 10*a* of the metallic plate 10 and the aperture 3*a* of the ink fluid route forming member 3 connected to the aperture 10*a*. Next, by forming the ink fluid route 4 having the thickness 40 μm by removing the positive type photoresist layer on the silicon substrate 1, an ink fluid path from the ink supply port 5 through the ink supply route 4 to the orifice 7 can be obtained.

As for another example of the scanning mechanism 15, though it is possible to use a mechanism in which both the excimer laser oscillator 16 and the substrate 1 to be processed are moved in a correlated manner, it is also within the scope of the present invention to use a mechanism in which one of them is fixed and the other is moved for scanning.

The range of the laser light exposure can be obtained by adjusting the number of pulses required for generating the laser light by the sum of the necessary and minimum number of pulses +α in order to make the laser light penetrate a little into the positive type photoresist layer, in which the necessary and minimum number of pulses corresponding to the thickness of the layer to be processed in ablation can be determined experimentally. For example, with respect to the epoxy resin layer having the thickness 20 μm and the laser light without scanning, the number of pulses of the laser light to be exposed is estimated to be about 200 by experiments.

In this embodiment, in the method of using Ni as the material of the metallic plate 10 as the contact mask, it is noted that the energy required for ablation of the metallic Ni and the energy required for ablation of the epoxy resin are different in large quantity. The energy required for ablation in the epoxy resin is 1 J cm$^2$ or less, and in contrast, the energy required for ablation in Ni is 10 J/cm$^2$ or less. In addition, with respect to the mechanism of ablation, ablation of the resin takes place as a result of cutting chemical bonds in a non-thermal process, whereas the ablation of metallic materials occurs as a result of melting the materials through the generation of heat to accomplish cutting. In addition, in this method using a contact mask, without forming an orifice at a designated position by using a mask installed in the laser light transfer system, as a work is prepared with a contact mask being attached to the work material at a designated position and the laser light is exposed directly onto the mask and the work, fine adjustment of the target position of the laser light is not required. As the orifice 7 is formed by photolithography technology, the position of the orifice 7 on the substrate 1 can be determined very precisely.

As shown in Japanese Patent Application Laying-open No. 169559/1991, as the contact, mask made of metallic materials is exposed to the laser light applied in repetitive pulses, although the energy density of the laser light does not even reach a level between 3 and 10 J/cm$^2$ (which is the level required for the ablation of metallic materials,) mechanical damage is produced on the contact mask. This changes the shape of the mask, which defines the shape of the orifice, and these changes lead to the production of irregularly-shaped orifices. On the other hand, in this embodiment according to the present invention, as the metallic plate 10 as a contact mask is mounted on the substrate to be processed and used only when forming the orifice on its corresponding substrate, the above problem can be solved.

In the excimer laser processing of this embodiment, as the position to which the laser light exposure is projected is altered by scanning operation, a large-sized substrate such as an Si wafer of 8-inch diameter can be processed to form a plurality of recording heads at one time. In addition, by scanning operation, deviation of the energy density distribution of the laser light exposure projected from the excimer laser oscillator can be reduced, and the orifice 7 of the orifice plate can be formed precisely.

Therefore, as it is not necessary to install any optical system for correcting the energy distribution or enhancing the intensity of the energy density into the excimer laser oscillator, the scanning method of this embodiment solves the problem in the prior art with respect to the apparatus cost and the operating cost. In case that the energy density of the generic laser beam is low, the apparatus of this embodiment can be used by modifying the structure of its components such as replacing the rear mirror of the laser oscillator with concave mirror having a shorter focal length.

In this embodiment, what is used is a side-shoot type recording head in which an ink drop is projected in the vertical direction with respect to the surface of the substrate 1 having an ejection means by the heat generation device. However, it is also possible to use a piezo device as an ejection means for an edge-shoot type recording head in which an ink drop is projected in the horizontal direction with respect to the surface of the substrate 1. These variations can be applied in the embodiments to be described later. In this embodiment, although epoxy resin is used as a material of the ink fluid route forming member 3 in order to maintain ink resistance, the material used for this member is not limited to this example as a material for the ink fluid route forming member 3, another thermoset resin, thermoplastic resin and photo-setting resin may be used. More concretely, for example, acrylic resin, diglycoldialkylcarbonate resin, unsaturated polyester resin, polyurethane and phenolic resin may be used as materials for the ink fluid route forming member 3. In case of using the thermoplastic resin as materials for the ink fluid route forming member 3, it is necessary to use photo resist having an excellent thermo-resistivity and forming the ink fluid route 4. Further, in case of using the photo-setting resin as materials for the ink fluid route forming member 3, it is necessary to use a substrate 1 made of transparent material such as glass.

Embodiment 2

Figure 5:
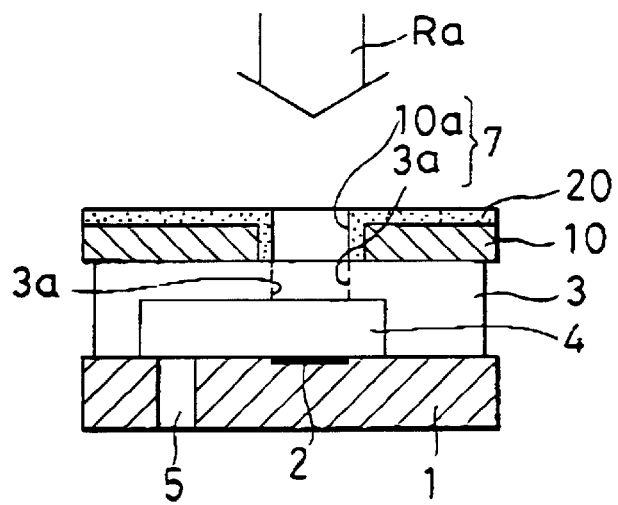
FIG. 5 is a vertical cross-sectional view showing another embodiment of method for fabricating an ink jet recording head according to the present invention.

FIG. 5 is a vertical cross-sectional view showing another embodiment of ink jet recording head fabrication using a method in accordance with the present invention. In FIG. 5, like parts of the components of the ink jet recording head described in FIGS. 3 and 4 are assigned like numerals and their redundant explanations are not repeated.

In this embodiment, before the laser ablation processing and after forming the aperture 10*a* on the metallic plate 10, the Au plating layer 20 is formed on the upper face of the metallic plate 10 to be used as an orifice plate and in the inside face and the bottom face of the aperture 10*a* in the metallic plate 10. Similarly to the embodiment 1, by shaping the metallic plate 10 in a designated pattern, the aperture 10*a* is formed in a designated position as a part of the orifice 7. Next, after photoresist (not shown) is removed from the metallic plate 10, the above mentioned Au plating layer 20 is formed with a negative electrode composed of Ni of the metallic plate 10. The Au density in the plating solution may be generally 14 g/l and the thickness of plated Au layer may be between 0.5 and 1 mm.

Next, KrF excimer laser light having the wave length 238 nm is exposed sequentially onto the Au plating layer 20 formed at the bottom of the aperture 10*a* and onto a part of the ink fluid route forming member 3 below the Au plating layer 20, and a part of the ink fluid route forming member 3 is removed until the positive type photoresist layer is reached, and finally, the aperture 3*a* forming the orifice 7 together with the aperture 10a is formed. After this processing, in a manner similar to that for the embodiment 1, the ink jet recording head can be fabricated as expected.

In this embodiment, excimer laser exposition is performed after Au plating processing. In case of using non-cyan Au plating solution, there is no problem in using a positive type photoresist in a solution without considering their interaction, and hence, it may be allowed that Au plating processing can be performed after exposing the excimer laser light and forming the aperture. As the surface of the orifice of the ink jet recording head is expected to be durable for the mechanical cleaning operations by a rubber blade, Au plating should be performed in electrolytic plating processing in order to establish a plated Au layer of sufficient hardness and smoothness.

An Au or Pt plating layer on a Ni substrate is stable for a long time with respect to ink fluid reactivity and to shielding its surface against the solution. In addition, with this plating layer, water-shielding resin cannot be introduced into the orifice.

Embodiment 3

Figure 6:
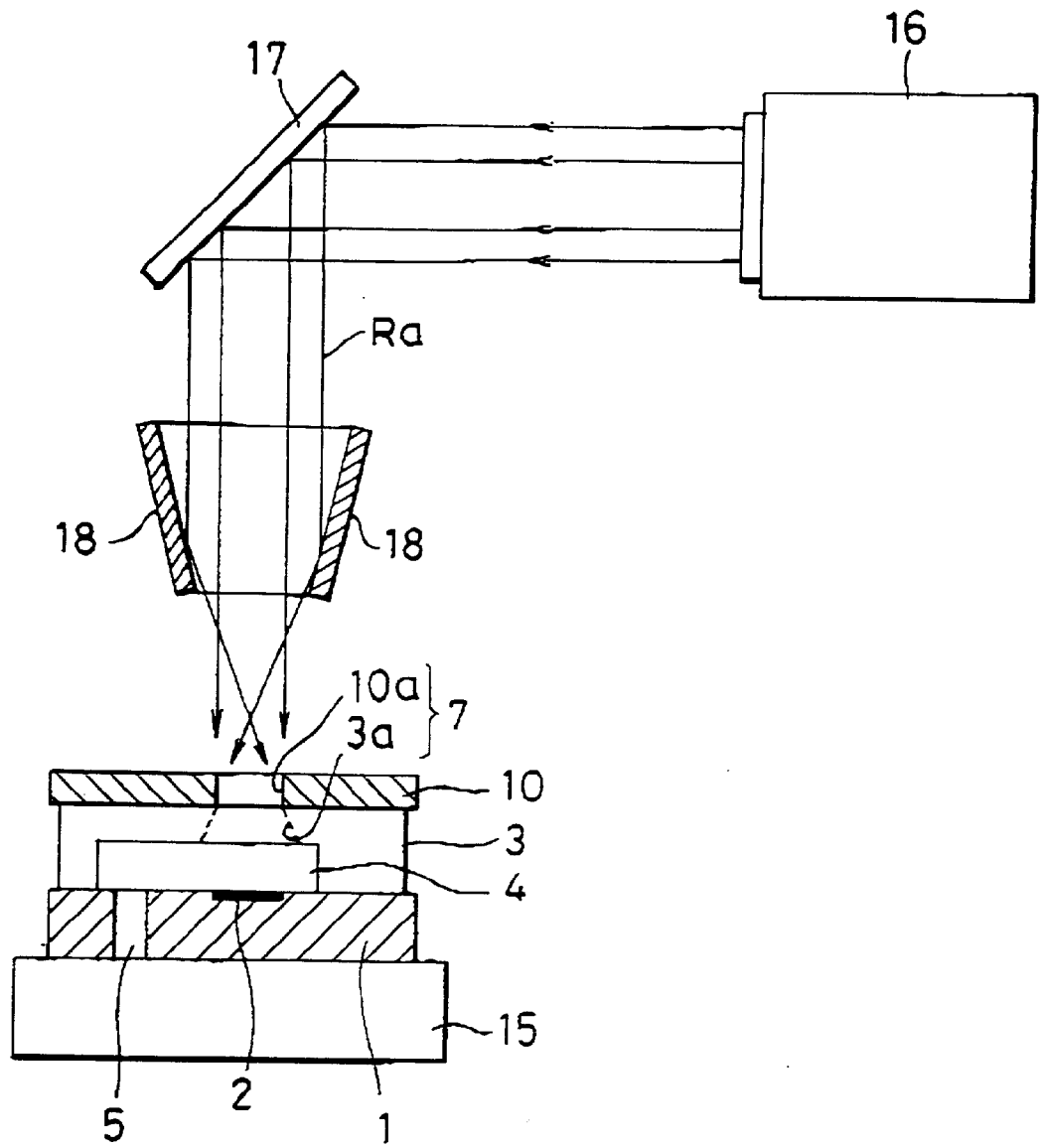
FIG. 6 is a vertical cross-sectional view showing a further another embodiment of method for fabricating an ink jet recording head according to the present invention.

FIG. 6 is a vertical cross-sectional view showing another embodiment of ink jet recording head fabrication according to the present invention. In FIG. 6, a component 18 is a mirror having a conical shape for enlarging the intensity of the diverging light component of the excimer laser light. The similar fabricating processing as in the embodiment 1 with the mirror 18 can make the shape of the aperture 3a in the ink fluid route forming member 3 a back taper shape with its diameter gradually expanding toward its bottom direction, because the diverging light component penetrates in the ink fluid route forming member with its ablation reaction expanding more as the diverging light reaches deeper in the ink fluid route forming member 3. As the orifice 7 including the aperture 3a shaped as described above has such a shape that its diameter at the edge from which ink ejected is less than the diameter at the bottom of the aperture, the velocity of ink fluids ejected from the orifice can be increased so as to increase remarkably the recording performance by the recording head. The angle of the back taper shape in the orifice can be controlled arbitrarily by adjusting the layout of the mirror 18. in the embodiment 1, the orifice 7 can be established by selecting the energy density of the laser light to be used so that the shape of the orifice 7 may be hollow cylinder as an optimal shape and that a back taper shape may be formed by the combination of a positive type photoresist. In this embodiment, a continuous back taper shape can be obtained only with a single material processing.

Embodiment 4

FIG. 4 is a vertical cross-sectional view showing another embodiment of ink jet recording head fabrication according to the present invention. In this embodiment, the ink fluid route forming member 3 is formed by spin coating. That is, after forming the epoxy resin layer having a thickness 60 $\mu$m by the spin coating method so as to cover the positive type photoresist on the silicon substrate 1, the metallic plate 10 composed of a Ni layer 20 $\mu$m in thickness is glued on the epoxy resin layer, and after hardening the epoxy resin, the silicon substrate 1 and the metallic plate 10 bridged by the ink fluid route forming member 3 are assembled in a single unit. And next, similarly to the embodiment 1, a photoresist pattern is developed n the metallic plate 10 with reference to the alignment mark on the silicon substrate 1, and the orifice is formed at a designated position, and finally, the above described photoresist is removed.

In the above processes, the single-unit substrate 1 on which the aperture 10a to be used as a part of the orifice is formed can be obtained. By projecting the KrF excimer laser (the wavelength: 248 nm) with the energy density 500 mJ/cm$^2$ from the surface of the orifice, that is, the aperture 10a, and moving the substrate 10 with the scanning mechanism 15 at the same time, only a part of the epoxy resin layer exposed out from the aperture 10a is gradually removed by ablation, and finally the aperture 3a is formed. The laser light exposure is terminated when the range of the laser light reaches the positive type photoresist layer which was formed on the silicon substrate 1 before hand. So far, note that the orifice is completed and the positive type photoresist is removed, the ink fluid route path is found to be established from the ink supply port to the orifice.

The range of the laser light exposure can be obtained by adjusting the number of pulses required for generating the laser light by the sum of the necessary and minimum number of pauses +$\alpha$ in order to make the laser light penetrate a little into the positive type photoresist layer, in which the necessary and minimum number of pulses corresponding to the thickness of the layer to be processed in ablation can be determined experimentally. For example, with respect to an epoxy resin layer that is 20 $\mu$m in thickness and the laser light without scanning, the number of pulses of the laser light to be exposed is estimated to be about 200 by experiments.

It will be appreciated that this embodiment can provide almost the same benefits as embodiment 1.

Embodiment 5

Figure 7:
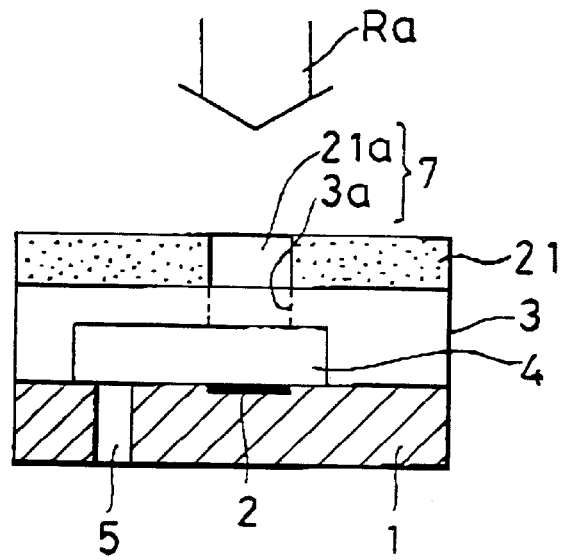
FIG. 7 is a vertical cross-sectional view showing yet another embodiment of method for fabricating an ink jet recording head according to the present invention.

FIG. 7 is a vertical cross-sectional view for showing another embodiment of the ink jet recording head fabrication method of the present invention.

This embodiment is similar to the previous embodiment 2 save that this embodiment uses a method in which the Ni metallic plate 10 is glued and an Au plating layer is formed on it. As shown in FIG. 7, what is specific to this embodiment is that making fluorine-containing polymers, fluorine-containing oligomer or graphite fluoride dispersed in the Ni plating solution, the eutectic plating layer 21 is formed on the epoxy resin and the ink fluid route forming member 3.

As for fluorine-containing polymers such as polytetrafluoroethylene with low molecular weight, SefralLoop V of Central Glass Co. Ltd. Japan, and as for graphite fluoride, Sefbon CMA of Central Glass Co. Ltd., are recommended. In addition, as for Ni plating solution, it is possible to use a complex plating solution for electrolytic grating, MetaFluon, or a complex plating solution for non-electrolytic grating, NimFluon, both supplied by Industry Co. Ltd. Japan.

As described above, in the ink jet recording head fabricating method according to the present invention, what can be readily avoided are such problems found in the prior art as the displacement between the orifice plate on which the orifice is formed and the substrate having the ink ejection means, and the introduction of bonding materials into the orifice.

In the fabricating method according to the present invention, it will be appreciated that the aperture to be used as the orifice can be formed by lens-free processing which may lead to the reduction of cost for excimer laser processing, and that the back taper shape making it efficient to eject ink can be obtained easily, and furthermore that the stable ink-resistance layer can be formed on the surface of the orifice.

As for one embodiment of the ink jet recording head fabricating apparatus according to the present invention, what can be stated is a structure including at least a transfer forming metallic mold for molding the silicon substrate 1 and the metallic plate 10 to be used as the orifice plate in a single unit as shown in FIG. 3; a scanning mechanism 15 for moving the silicon substrate 1 in the two-dimensional direction extended along the surface of the silicon substrate 1; and an excimer laser oscillator 16 and a reflection mirror 17 for forming the orifice 7 by ablation induced by the excimer laser light projected through the aperture 10a formed in the metallic plate 10 shown in FIG. 4. In case of fabricating an ink jet recording head with such a fabricating apparatus as described above, it will be appreciated that, in fabricating an above mentioned side-shoot type recording head, the orifice 7 can be formed precisely just above the heat generation device 2 on the silicon substrate 1.

In addition, by making the structure of the above described fabricating apparatus include additionally the mirror 18 for enlarging the intensity of the diverging light component as shown in FIG. 6, it will be readily appreciated that the orifice has a cross-section shaped with a reversed-tapered profile in the direction in which an ink is ejected. Owing to this configuration, it will be appreciated that an ink jet recording head offering high performance in ejecting ink as described before can be obtained.

Figure 8A:
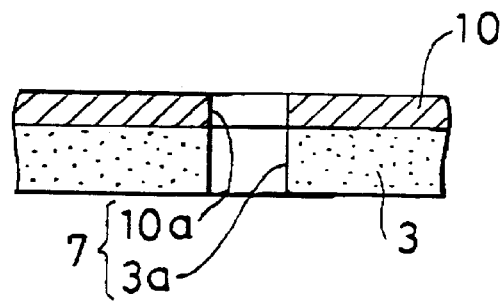
FIG. 8A is a vertical cross-sectional view showing an orifice formed by anisotropic etching using a plasma etching method.
Figure 8B:
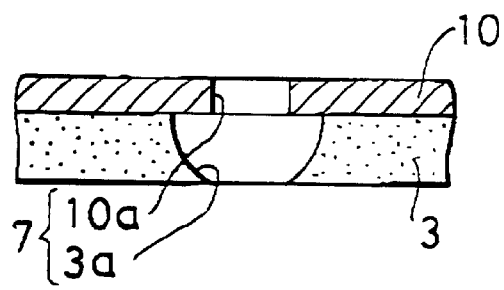
FIG. 8B is a vertical cross-sectional view showing an orifice formed by isotropic etching using the plasma etching method.

In any one of embodiments described above, the formation of the orifice 7 is performed by using an excimer laser. Accordingly, the cross-sectional shape of the orifice 7 can be made to have a back taper by producing laser ablation using the excimer laser. The orifice 7 also can be formed by plasma etching. However, plasma etching does not serve to form the orifice 7 with a back taper as the cross-sectional shape. As shown in FIG. 8A, by using anisotropic etching of the plasma etching, the orifice 7 has a taper shape which is similar to a straight shape. On the other hand, by using isotropic etching of the plasma etching, the orifice 7 has a shape as shown in FIG. 8B. In this case, a part of the ink fluid route forming member 3 facing to the orifice 7 is outwardly etched so that the orifice 7 cannot be formed in a back taper shape. Therefore, it is not feasible to form the orifice 7 by using isotropic etching of the plasma etching.

As shown above, the ink jet recording head obtained by the ink jet recording fabricating method according to the present invention has a high performance in ejecting ink.

Furthermore, the ink jet recording head according to the present invention can be used by installing an ink tank for supplying the ink to the head. An ink jet recording cartridge connected the head with the tank is recognized as one that is small-sized and that attains an excellent performance for ejecting ink.

In addition, the ink jet recording head or the ink jet recording cartridge of the present invention can be installed into the printer described in U.S. Pat. No. 5,132,711. The content of the U.S. Pat. No. 5,132,711 is incorporated by reference herein into the present specification.

The present invention achieves distinct effect when applied to a recording head or a recording apparatus which has means for generating thermal energy such as electro-thermal transducers or laser light, and which causes changes in ink by he thermal energy so as to eject ink. This is because such a system can achieve a high density and high resolution recording.

A typical structure and operational principle thereof are disclosed in U.S. Pat. Nos. 4,723,129 and 4,740,796, and it is preferable to use these basic principles to implement such a system. Although this system can be applied either to on-demand type or continuous type ink jet recording systems, it is particularly suitable for the or-demand type apparatus. This is because the on-demand type apparatus has electrothermal transducers, each. disposed on a sheet or liquid passage that retains liquid (ink), and operates as follows: first, one or more drive signals are applied to the electrothermal transducers to generate thermal energy corresponding to recording information; second, the thermal energy induces a sudden temperature rise that exceeds the nucleate bailing point so as to cause film boiling on heating portions of the recording head; and third, bubbles are grown in the liquid (ink) corresponding to the drive signaLs. By using the growth and collapse of the bubbles, the ink is expelled from at least one of the ink ejection orifices of the head to form one or more ink drops. A drive signal in the form of a pulse is preferable because the growth and collapse of the bubbles can be achieved instantaneously and suitably by this form of drive signal. As a drive signal in the form of a pulse, those described in U.S. Pat. Nos. 4,464,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of recording head which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laying-open Nos. 123670/1984 and 138461/1984 in order to achieve similar effects. The form discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, regardless of the type of the recording head, the present invention can achieve recording positively and effectively.

The present invention can be also be applied to a so-called full-line type recording head whose length equals the maximum length across a recording medium.

Such a recording head may consists of a plurality of recording heads combined together, or one integrally arranged recording head.

In addition, the present invention can be applied to various types of serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as part of the recording apparatus because they serve to make the effect of the present invention more reliable. Examples of such a recovery system are a capping means and a cleaning means for the recording head, and a pressure or suction means for the recording head. Examples of such a preliminary auxiliary system are a preliminary heating means utilizing electrothermal transducers or a combination of other heater elements and the electrothermal transducers, and a means for carrying out preliminary ejection of ink independently of the ejection for recording. These systems are effective for reliable recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in the range of 30° C. to 70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed form solid to liquid state by positively utilizing the thermal energy which would otherwise cause the temperature rise; or the ink, which is dry when left in air, is liquefied in response to the thermal energy of the recording signal. In such cases, the ink may be retained in recesses or though apertures formed in a porous sheet as liquid or solid substances so that the ink faces the electrothermal transducers as described in Japanese Patent Application Laying-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a readers and as an output device of a facsimile apparatus having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A method for fabricating an ink jet recording head having an orifice for ejecting an ink, an ink fluid path communicating with the orifice, and an energy generation device for generating energy which serves to eject the ink, comprising the steps of:

preparing a substrate having the energy generation device, the substrate having a face;

arranging a positive type photoresist on the substrate so as to cover the energy generation device, the photoresist having a pattern corresponding to the ink fluid path;

arranging an ink fluid route forming member on the substrate so as to cover the positive type photoresist;

arranging a first plating layer: on a face of the ink fluid route forming member;

forming an opening in the plating layer corresponding to the orifice;

irradiating an excimer laser light onto the face of the ink fluid route forming member through the opening in the plating layer and then onto the positive type photoresist without exposing the face of the substrate; and removing the positive type photoresist such that the ink fluid path communicates with the orifice.

2. A method as in claim 1, wherein said energy generating device is an electrothermal transducer which generates thermal energy to cause a film boiling of the ink.

3. A method as in claim 1, wherein said excimer laser light is obtained using an optical resonator installed in an excimer laser oscillator.

4. A method as in claim 1, wherein said excimer laser light is obtained using an optical system amplifying a diverging light component of said excimer laser light.

5. A method as in claim 1, further comprising the step of scanning said excimer laser light on a workpiece which is obtained by integrating said substrate with said top plate, while moving relatively one of said excimer laser light and said workpiece to the other, or moving both said excimer laser light and said workpiece.

6. A method as in claim 1, further comprising a step of plating a metallic second plating layer comprising at least one of Au and Pt, and the metallic plating layer is plated above said ink fluid route forming member having said orifice, prior to the irradiating step.

7. A method as in claim 1, further comprising a step of plating a metallic second plating layer comprising at least one of Au and Pt, and the metallic plating layer is plated above said ink fluid route forming member having said orifice, after the irradiating step.

8. A method as in claim 1, wherein said first plating layer is an eutectic plating layer which is obtained from a metal and a par-fluorocarbon including at least one of a fluorine-containing polymer and a fluorine-containing oligomer.

9. A method as in claim 1, wherein said first plating layer is an eutectic plating layer which is obtained from a metal and a fluorine-containing graphite.

10. A method for fabricating an ink jet recording head having an orifice for ejecting an ink, an ink fluid path communicating with the orifice, and an energy generation device for generating energy which serves to eject the ink, comprising the steps of:

preparing a substrate having the energy generation device, the substrate having a face;

arranging a positive type photoresist on the substrate so as to cover the energy generation device, the photoresist having a pattern corresponding to the ink fluid path;

arranging an ink fluid route forming member on the substrate so as to cover the positive type photoresist;

arranging a mask member on a face of the ink fluid route forming member;

irradiating an excimer laser light onto the face of the ink fluid route forming member through an opening in the mask member and then onto the positive type photoresist without exposing the face of the substrate; and removing the positive type photoresist such that the ink fluid path communicates with the orifice.

* * * * *

UNITED STATES PATENT AND TRADEMARK OFFICE
CERTIFICATE OF CORRECTION

PATENT NO.   : 5,948,290
DATED        : September 7, 1999
INVENTOR(S)  : HAJIME YAMAMOTO ET AL.

Page 1 of 2

It is certified that error appears in the above-identified patent and that said Letters Patent is hereby corrected as shown below:

ON THE TITLE PAGE

[56] In References Cited, under U.S. PATENT DOCUMENTS: "4,345,263 8/1982 Shirato et al." should read --4,345,262 8/1982 Shirato et al.--.

COLUMN 2

Line 55, "inabiility" should read --inability--.

COLUMN 10

Line 21, "epoxy resin." should read --epoxy resin--.

COLUMN 12

Line 13, "with" should read --with a--.

COLUMN 13

Line 41, "mirror 18." should read --mirror 18--; and
Line 61, "developed n" should read --developed on--.

COLUMN 15

Line 56, "he" should read --the--.

UNITED STATES PATENT AND TRADEMARK OFFICE
CERTIFICATE OF CORRECTION

PATENT NO.   : 5,948,290

DATED        : September 7, 1999

INVENTOR(S)  : HAJIME YAMAMOTO ET AL.

It is certified that error appears in the above-identified patent and that said Letters Patent is hereby corrected as shown below:

COLUMN 16

Line 6, "bailing" should read --boiling--;
    Line 8, "signaLs." should read --signals.--; and
    Line 40, "consists" should read --consist--.

COLUMN 17

Line 22, "form" should read --from--; and
    Line 37, "readers" should read --reader,--.

Signed and Sealed this

Twenty-sixth Day of September, 2000

Attest:

Q. TODD DICKINSON

Attesting Officer      Director of Patents and Trademarks